Mar. 13, 1923.
H. SCHMITT.
AUTOMOBILE LICENSE TAG LIGHT.
FILED JUNE 5, 1922.
1,448,599.
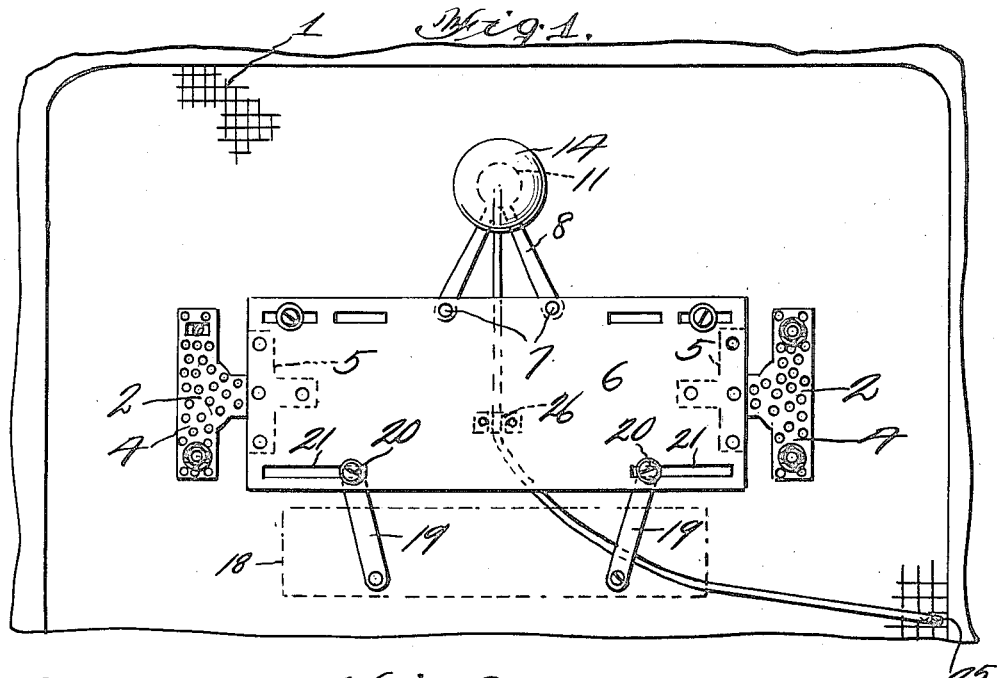
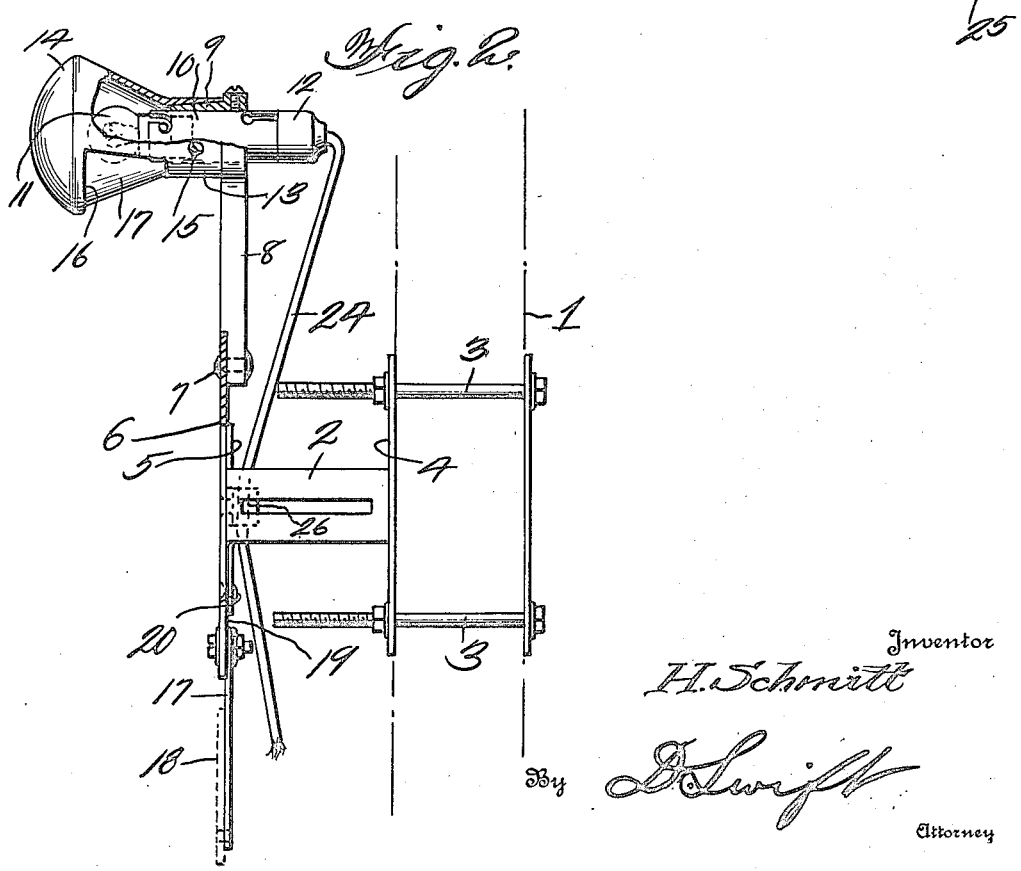
Inventor
H. Schmitt
By [signature]
Attorney Patented Mar. 13, 1923.

1,448,599

UNITED STATES PATENT OFFICE.

HERMAN SCHMITT, OF SHEBOYGAN, WISCONSIN.

AUTOMOBILE LICENSE-TAG LIGHT.

Application filed June 5, 1922. Serial No. 565,922.

*To all whom it may concern:*

Be it known that I, HERMAN SCHMITT, a citizen of the United States, residing at Sheboygan, in the county of Sheboygan, State of Wisconsin, have invented a new and useful Automobile License-Tag Light; and I do hereby declare the following to be a full, clear, and exact description of the invention, such as will enable others skilled in the art to which it appertains to make and use the same.

The invention relates to license tag lights for automobiles, and has for its object to provide a lighted license tag supported spaced from a radiator on brackets, said tag being provided with upwardly extending brackets terminating in a sleeve, said sleeve supporting in a horizontal plane a light, the rays from which are deflected downwardly by a hooded member; also to provide downwardly extending arms adjustable in relation to each other, said arms being carried by the tag and adapted to support a second plate, for instance a plate having the name of the town thereon; also to provide means whereby the light may be lighted or turned out from a point remote in relation to the light, for instance on the instrument board of the automobile.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of a conventional form of automobile radiator, showing the device applied thereto.

Figure 2 is a side elevation of the device, part being broken away to better show the light structure.

Referring to the drawing, the numeral 1 designates a conventional form of automobile radiator and 2 outwardly extending brackets which are secured to the radiator by means of bolts 3 which pass through the openings in the radiator and through perforated flanges 4 of the brackets 2. By perforating the flanges air will be allowed to pass through the radiator behind the flanges 4 thereby allowing the radiator to be thoroughly cooled in the usual manner. The outer ends of the brackets 2 terminate in T-shaped members 5 to which is secured the license plate 6 on which the number or the name of the State may be placed. The license plate 6 is supported spaced from the radiator 1 thereby allowing free circulation of air behind the plate in such a manner that the plate will not interfere with the cooling of the radiator by the flow of air therethrough. Extending upwardly from the plate 6 adjacent its upper side and secured thereto at 7 is a bracket 8, the upper end of which terminates in a horizontally disposed sleeve 9, which extends forwardly and supports a sleeve 10 in one end of which an electric lamp 11 is held and in the other end an electric plug 12 is held. Disposed on the sleeve 9 is a sleeve 13 of a reflecting hood 14, said sleeve 13 being held on the sleeve 9 by means of the set screw 15. The lower side of the hood 14 is cut away at 16 and is closed by transparent material 17, preferably celluloid or isinglass and through which transparent member the light rays from the lamp 11 pass and are reflected by the hood 14 onto the license plate 6 and the auxiliary plate 18 supported thereby and located beneath the plate 6. The plate 18 may have thereon the name of the town which is now the practice. Plate 18 is supported by means of pivoted arms 19, the upper ends of which are secured to the plate 6 by means of bolts 20 which pass through said arms and through the plate 6. By means of the slot 21 and bolts 20 the arms 19 may be adjusted for holding various lengths of plates 18 and in various positions in relation to the ends of the plate 6.

From the above it will be seen that a license tag light is provided and so constructed that the license tag may be carried on the forward end of the automobile and supported on a radiator in such a manner that the tag will not interfere with the free circulation of air to the radiator. It will also be seen that by placing the tag in front of the radiator the same may be easily read when approaching other vehicles and traffic officers thereby allowing the number of the machine to be easily ascertained, which is not the case where the license tag is located at the rear of the machine, and where license tags are located forwardly of the automobile no attempt has been made to illuminate the same, therefore it will be seen that an illuminated front license tag is provided.

The invention having been set forth what is claimed as new and useful is:—

The combination with an automobile radiator, a license plate supported by said radiator and located spaced therefrom, of an illuminating light for said plate, said light comprising an upwardly extending bracket carried by the plate centrally thereof, said bracket terminating in a horizontally disposed sleeve extending outwardly in relation to the plate, a lamp carrying sleeve disposed in said horizontally disposed sleeve, a reflector hood detachably secured to the bracket carried sleeve, said reflector hood having a sleeve engaging over the horizontally disposed sleeve, said reflector hood being frusto-conically shaped and having its wide end outwardly disposed, and a transparent member in the under side of the reflector hood.

In testimony whereof I have signed my name to this specification in the presence of two subscribing witnesses.

HERMAN SCHMITT.

Witnesses:
    FRED FINGER,
    CHAS. KOECHEL.